(12) United States Patent
Shuchart et al.

(10) Patent No.: US 6,506,711 B1
(45) Date of Patent: *Jan. 14, 2003

(54) REDUCING ALUMINUM COMPOUND PRECIPITATION DURING SUBTERRANEAN FORMATION ACIDIZING

(75) Inventors: Chris E. Shuchart, Duncan, OK (US); Rick D. Gdanski, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/492,680

(22) Filed: Jun. 20, 1995

Related U.S. Application Data

(63) Continuation-in-part of application No. 08/154,822, filed on Nov. 18, 1993, now abandoned.

(51) Int. Cl.$^7$ .............................. C09K 3/00; E21B 43/27
(52) U.S. Cl. .................. 507/267; 507/269; 507/277; 507/933; 166/300; 166/307
(58) Field of Search ................. 507/267, 933, 507/269, 277; 166/300, 307

(56) References Cited

U.S. PATENT DOCUMENTS

| | | | | |
|---|---|---|---|---|
| 2,175,095 A | * | 10/1939 | Stoesser | 166/21 |
| 3,150,081 A | | 9/1964 | Haslam | 210/58 |
| 3,294,689 A | | 12/1966 | Pierce | 252/82 |
| 3,828,854 A | * | 8/1974 | Templeton et al. | 166/307 |
| 3,885,630 A | | 5/1975 | Richardson | 166/307 |
| 3,889,753 A | | 6/1975 | Richardson | 166/307 |
| 4,090,563 A | | 5/1978 | Lybarger et al. | 166/307 |
| 4,151,098 A | | 4/1979 | Dill et al. | 252/8.55 C |
| 4,151,879 A | * | 5/1979 | Thomas | 166/307 |
| 4,213,866 A | | 7/1980 | Ashby et al. | 252/8.55 C |
| 4,304,676 A | | 12/1981 | Hall | 252/8.55 C |
| 4,479,543 A | * | 10/1984 | Kalfayan et al. | 166/300 |
| 4,548,732 A | | 10/1985 | Scheuerman et al. | 252/8.55 C |
| 4,561,503 A | | 12/1985 | Wong | 166/307 |
| 4,574,050 A | | 3/1986 | Crowe et al. | 252/8.55 C |
| 4,595,517 A | | 6/1986 | Abadi | 252/82 |
| 4,599,182 A | | 7/1986 | Young et al. | 252/8.55 C |
| 4,698,168 A | | 10/1987 | Briggs | 252/8.553 |
| 4,888,121 A | | 12/1989 | Dill et al. | 252/8.553 |
| 4,949,790 A | | 8/1990 | Dill et al. | 166/307 |
| 5,529,125 A | * | 6/1996 | Di Lullo Arias | 166/307 |

FOREIGN PATENT DOCUMENTS

| | | |
|---|---|---|
| GB | 2071737 A | 9/1981 |
| GB | 2177145 A | 1/1987 |

OTHER PUBLICATIONS

SPE Paper No. 23812 entitled "Identification Of Aluminum Scale With The Aid Of Synthetically Produced Basic Aluminum Fluoride Complexes" by Chris E. Shuchart and Syed A. Ali, (1993).

* cited by examiner

*Primary Examiner*—Philip Tucker
(74) *Attorney, Agent, or Firm*—Robert A. Kent; Clifford C. Dougherty, III

(57) ABSTRACT

Methods and compositions for reducing the precipitation of fluoride compounds following the contact of an aluminum containing subterranean formation with an acid solution containing hydrofluoric acid are provided. In accordance with the methods, a hydroxy carboxylic acid is combined with the hydrofluoric acid solution and the subterranean formation is contacted with the resulting acid solution.

10 Claims, No Drawings

REDUCING ALUMINUM COMPOUND PRECIPITATION DURING SUBTERRANEAN FORMATION ACIDIZING

CROSS-REFERENCE TO RELATED APPLICATION

The present application is a continuation-in-part of U.S. patent application Ser. No. 08/154,822 filed Nov. 18, 1993 now abandoned entitled "Reducing Aluminum Compound Precipitation Following Subterranean Formation Acidizing."

BACKGROUND OF THE INVENTION

1. Field of the Invention.

The present invention relates generally to methods and compositions for acidizing oil and gas wells, and more particularly, to improved methods and compositions for acidizing aluminum and silicate containing formations with reduced aluminum compound precipitation.

2. Description of the Prior Art.

In well acidizing procedures for increasing the permeability of subterranean formations containing aluminum and silicates, such as, sandstone, aqueous acid solutions containing hydrochloric and hydrofluoric acid are often utilized. When used in high concentrations, hydrochloric acid can cause formation minerals to decompose causing formation permeability loss and some crude oils form sludges upon contact with hydrochloric acid. The hydrofluoric acid reacts with aluminum and silicate materials in the formations including clays and feldspars. A common problem involved in such acidizing procedures is the precipitation of reaction products, principally basic aluminum and aluminum-fluoride compounds, many of which occur almost immediately upon the spending of the acid solution and the elevation of the solution pH to a value between 2 and 3.

In addition to the immediate precipitation problems, precipitation can also occur after the hydrofluoric acidizing treatment is completed. This later precipitation has been called "alumino-silicate scaling" and is believed to be caused by spent hydrofluoric acid solution in the formation subsequently mixing with formation brine whereby the pH is caused to increase which in turn causes the precipitation.

Attempts to overcome the precipitation problems at high formation temperatures have included the use of hydrofluoric acid solutions including either acetic or formic acid in place of hydrochloric acid. While such fluids may overcome some problems such as hydrochloric acid sensitive formations or chloride induced corrosion or some acid sludging induced oil compatibility problems, they have not eliminated fluoride precipitate formation problems in the formations resulting in less than optimum acidizing treatment performance.

Thus, there is a need for improved methods and acidizing compositions whereby the precipitation of undesirable compounds following the acidizing of aluminum containing subterranean formations is reduced.

SUMMARY OF THE INVENTION

By the present invention, methods and compositions for acidizing aluminum containing subterranean formations without substantial aluminum compound precipitation are provided which meet the needs mentioned above and overcome the shortcomings of the prior art. The methods of the invention basically comprise including one or more hydroxy carboxylic acids in the hydrofluoric acid solution to be used in the acidizing procedure in an amount in the range of from about 0.2% to about 20% by weight of the resulting solution. The hydroxy carboxylic acid or acids function as a buffering agent in the acid solution which delays the increase in pH and the onset of precipitation. In addition, the hydroxy carboxylic acid or acids function as a chelating agent for aluminum and aluminum-fluoride cations which form the basic compounds that precipitate. The compositions of the invention are basically comprised of water, hydrofluoric acid and at least one hydroxy carboxylic acid.

It is, therefore, a general object of the present invention to provide methods and compositions for reducing the precipitation of aluminum compounds following the acidizing of aluminum containing subterranean formations with hydrofluoric acid solutions.

Other objects, features and advantages of the invention will be readily apparent to those skilled in the art upon a reading of the description of preferred embodiments which follows.

DESCRIPTION OF PREFERRED EMBODIMENTS

In carrying out acidizing procedures for increasing the permeability of subterranean well formations whereby hydrocarbons more readily flow from the formations to well bores penetrating them, aqueous acid solutions are commonly utilized. The aqueous acid solutions have included hydrochloric acid, hydrofluoric acid, formic acid, acetic acid and various mixtures of such acids.

In acidizing formations which are made up of aluminum and silicate materials including clays and feldspars, that is, sandstone formations, aqueous acid solutions containing hydrofluoric acid have been utilized. In addition to hydrofluoric acid, the aqueous acid solutions have often included hydrochloric acid and have sometimes included acetic acid. Such acid solutions have generally contained hydrofluoric acid in an amount in the range of from about 0.5% to about 6% by weight of solution and hydrochloric acid in an amount in the range of from about 5% to about 15% by weight of solution. When acetic acid has been included, it has been present in an amount of from about 1% to about 10% by weight of the resulting acid solution.

A typical sandstone formation acidizing fluid has been comprised of water, hydrofluoric acid in an amount in the range of from about 1.5% to about 3% by weight of the acid solution and hydrochloric acid in an amount in the range of from about 12% to about 13.5% by weight of the acid solution. Such aqueous acid solutions are typically prepared by adding ammonium bifluoride to a 15% by weight aqueous hydrochloric acid solution. As is well understood by those skilled in the art, the acid solutions typically also include various additives such as surfactants, corrosion inhibitors, iron control agents, mutual solvents and the like.

Retarded aqueous hydrofluoric acid compositions have also been utilized for dissolving subterranean formation materials. Such compositions form temporary fluoride complexes or otherwise delay the formation of hydrofluoric acid whereby the reaction rate of the hydrofluoric acid with formation materials is retarded. For example, U.S. Pat. No. 4,304,676 issued on Dec. 8, 1981 to Hall describes retarded aqueous hydrofluoric acid compositions comprised of water, a mineral acid, e.g., hydrochloric acid, a fluoride compound which is a source of hydrofluoric acid in an acidic environment, e.g., ammonium bifluoride, and an aluminum compound which produces aluminum III ions, e.g., aluminum chloride. The aluminum III ions form aluminum fluoride complexes which retard the formation of hydrofluoric acid in the aqueous composition.

As mentioned above, a common problem involved in sandstone acidizing with aqueous acid solutions containing hydrofluoric acid, both retarded and non-retarded, has been the precipitation of reaction products. The precipitation occurs both immediately upon the spending of the acid solution when the pH increases to values between 2 and 3, and later when spent acid solution remaining in the acidized formation is contacted by water produced from the formation. By the present invention, such precipitation is reduced or prevented by including a hydroxy carboxylic acid in the acidizing solution.

It has been determined that the aluminum compounds that precipitate from acid solutions containing hydrofluoric acid when the solutions are utilized to acidize aluminum containing subterranean formations are aluminum hydroxide and aluminum fluoride hydroxide. Such basic aluminum compounds can precipitate beginning at pH values between 2 and 3, and the alumino-silicate scale formed in subterranean formations and on well components is comprised of a mixture of silica gel and the above mentioned basic aluminum compounds.

When one or more hydroxy carboxylic acids are included in an aqueous hydrofluoric acid solution utilized for acidizing aluminum containing formations, e.g., sandstone formations, the hydroxy carboxylic acid or acids function as buffering agents which delay the pH increase of the acid solution and the precipitation of the basic aluminum compounds. In addition, the hydroxy carboxylic acid or acids function as chelating agents whereby they coordinate to aluminum and aluminum fluoride cations in solution and prevent or reduce the formation of the basic compounds which precipitate.

Thus, in accordance with the methods of the present invention, at least one hydroxy carboxylic acid is included in the aqueous acid solution containing hydrofluoric acid to be utilized for acidizing an aluminum containing subterranean formation. Generally, the hydroxy carboxylic acid or acids are added to the solution in an amount in the range of from about 0.2% to about 20% by weight of the resulting acid solution. The presence of the hydroxy carboxylic acid or acids in an amount within the above range buffers the acid solution and coordinates the aluminum and aluminum fluoride therein to a degree that aluminum compound precipitation is substantially reduced or prevented.

Preferred hydroxy carboxylic acids for use in accordance with this invention are α-hydroxy carboxylic acids. The most preferred such acids are those selected from the group consisting of citric acid, tartaric acid, malic acid, lactic acid and hydroxyacetic (glycolic) acid. of the foregoing acids, citric acid and tartaric acids are preferably, included in an aqueous acid solution containing hydrofluoric acid in an amount in the range of from about 0.25% to about 5% by weight of the resulting solution. Lactic acid and hydroxyacetic acid preferably are used in an aqueous acid solution in an amount in the range of from about 5% to about 15% by weight of the resulting solution.

In a typical sandstone acidizing treatment in accordance with the present invention, the formation to be treated is first preflushed with an aqueous solution of ammonium chloride or hydrochloric acid or both. Following the preflush, the aqueous acid solution containing hydrofluoric acid, a hydroxy carboxylic acid and optionally hydrochloric acid present in an amount sufficient to protonate the source of the hydrofluouric acid, is introduced into and reacted with the sandstone formation. After the acidizing reaction has been completed whereby the permeability of the formation has been increased, the formation is overflushed with an aqueous solution of ammonium chloride, hydrochloric acid or both. In such treatments, it is preferred that in addition to the hydrofluoric acid solution used, both the preflush and overflush solutions include one or more hydroxy carboxylic acids in an amount in the range of from about 0.2% to about 20% by weight of the resulting preflush or overflush solutions.

The improved compositions of this invention for acidizing an aluminum containing subterranean formation without substantial aluminum compound precipitation are basically comprised of water, hydrofluoric acid, and at least one hydroxy carboxylic acid present in an amount in the range of from about 0.2% to about 20% by weight of the composition.

A preferred composition is comprised of water, hydrofluoric acid present in an amount in the range of from about 0.1% to about 6% by weight of said composition and a hydroxy carboxylic acid present in an amount in the range of from about 0.2% to about 20% by weight of the composition.

Another preferred such composition is comprised of water, hydrofluoric acid present in an amount in the range of from about 0.25% to about 3% by weight of the composition, hydrochloric acid present in an amount in the range of from about 1% to about 5% by weight of the composition, and at least one hydroxy carboxylic acid present in an amount in the range of from about 5% to about 15% by weight of the composition.

In order to further illustrate the methods and compositions of this invention and facilitate a clear understanding thereof, the following examples are given.

EXAMPLE 1

Aqueous solutions containing aluminum fluoride cation ($AlF^{2+}$) with and without acetic acid and hydroxyacetic acid were prepared. The solutions were formed by combining aluminum chloride ($AlCl_3$) and ammonium bifluoride ($NH_4HF_2$) in an aqueous solution to give an overall aluminum concentration of about 0.58 molar and a fluoride to aluminum ratio of 1.0. The resulting solutions were titrated at about 90° C. with a base (NaOH). The base requirements expressed in hydroxyl to aluminum (OH/Al) molar ratios and the solution pH values at precipitation were determined. The amount of base consumed without precipitation indicates if the organic acids tested reduce precipitation, and which organic acid provides the most reduction in precipitation. The results of these titration tests are set forth in Table I below.

TABLE I

Titrations of Solutions Containing 0.58 M Aluminum, 0.58 M Fluoride and Acetic and Hydroxyacetic acids

| Organic Acid | Acid to Aluminum Molar Ratio | Precipitation Point pH | OH/Al Molar Ratio |
|---|---|---|---|
| none | 0 | 2.46 | 0.31 |
| none | 0 | 2.05 | 0.35 |
| acetic | 1.06 | 2.40 | 0.89 |
| acetic | 1.99 | 3.02 | 0.99 |
| hydroxyacetic | 1.04 | 3.29 | 1.81 |
| hydroxyacetic | 2.11 | 5.90 | 4.06 |

From Table I it can be seen that both acetic acid and hydroxyacetic acid reduce aluminum compound precipitation and that hydroxyacetic acid is much more effective than acetic acid.

EXAMPLE 2

Additional solutions containing various compounds were prepared in accordance with the procedure set forth in Example 1 above. As in Example 1, the solutions had overall aluminum and fluoride concentrations of about 0.58 molar each. In addition, the organic acid to aluminum ratio in the solutions ranged from about 0.4 to about 2.0. The solutions were titrated as indicated in Example 1 and the hydroxyl to aluminum ratios and pH values at precipitation were determined. The results of these tests are set forth in Table II below.

TABLE II

Titration of Solutions Containing 0.58 M
Aluminum, 0.58 M Fluoride and Other Compounds

| | | Precipitation Point | |
|---|---|---|---|
| Compound | Compound/Aluminum molar ratio | pH | OH/Al molar ratio |
| None | 0 | 2.11 | 0.34 |
| Acetic acid | 1.1 | 2.40 | 0.84 |
| Acetic acid | 2.0 | 3.02 | 0.96 |
| Glutaric acid | 1.0 | 2.53 | 1.00 |
| Hydroxyacetic acid | 0.5 | 2.63 | 1.14 |
| Hydroxyacetic acid | 1.0 | 3.29 | 1.81 |
| Hydroxyacetic acid | 2.1 | 5.99 | 4.10 |
| 80% Hydroxyacetic (20% Methanol) | 0.5 | 2.64 | 1.07 |
| 80% Hydroxyacetic (20% Methanol) | 1.0 | 3.01 | 1.88 |
| 50% acetic and 50% Hydroxyacetic acid mixture | 1.0 | 3.06 | 1.44 |
| Lactic acid | 1.0 | 3.10 | 1.76 |
| Mandelic acid | 1.0 | 2.03 | 1.02 |
| Malic acid | 0.4 | 3.01 | 1.68 |
| Malic acid | 1.0 | 7.60 | 4.35 |
| Tartaric acid | 0.4 | 3.08 | 1.92 |
| Tartaric acid | 1.0 | 5.93 | 3.63 |
| Citric acid | 0.4 | 3.25 | 2.04 |
| m-Hydroxybenzoic acid | 0.5 | 2.42 | 0.78 |
| Catechol | 0.5 | 2.08 | 0.41 |
| Glycine | 1.0 | 2.61 | 0.31 |

As shown by the above test data, basic aluminum fluoride complexes can precipitate from spent HF acid solutions when the pH increases to about 2.0 which corresponds to a hydroxyl to aluminum ratio of about 0.3. The use of one equivalent of acetic acid per aluminum can delay the onset of precipitation to a pH of about 2.4 corresponding to a hydroxyl to aluminum ratio of 0.84. Increasing the acetic acid content to two equivalents provides only a modest improvement in maintaining aluminum in solution.

Glutaric acid, a dicarboxylic acid, gave only slightly better results than acetic acid as a result of its not including a hydroxyl group to provide enhanced aluminum coordination.

The test data shows that hydroxyacetic acid is much more effective than acetic acid in providing a buffering effect as well as in coordinating to the aluminum fluoride cationic complex. That is, precipitation at one equivalent of hydroxyacetic acid per aluminum did not occur until a pH of 3.29 and a 1.81 hydroxyl to aluminum ratio.

Lactic acid which is hydroxyacetic acid substituted with a methyl group is about as effective as hydroxyacetic acid. Mandelic acid which is hydroxyacetic acid substituted with a phenyl group is less soluble, and thus, less effective than hydroxyacetic acid.

Malic acid and tartaric acid, both hydroxy dicarboxylic acids, were also tested. The structure of malic acid is equivalent to attaching acetic and glycolic acids together while tartaric acid can be thought of as diglycolic acid. As shown by the data in Table II, both malic acid and tartaric acid are much more effective in preventing aluminum precipitation than hydroxyacetic acid. As low as 0.4 equivalents of malic and tartaric acids are as effective as one equivalent of hydroxyacetic acid. As shown, tartaric acid is slightly better than malic acid at a concentration of 0.4 equivalent while the reverse is true at one equivalent.

Citric acid, a hydroxy tricarboxylic acid, is somewhat more effective than tartaric acid.

M-hydroxybenzoic acid which was not fully soluble at room temperature, but which dissolved upon heating, functioned at 0.5 equivalent similarly to one equivalent of acetic acid. Catechol and glycine were ineffective in preventing aluminum compound precipitation.

Thus, the test results given in Table II indicate that a hydroxy carboxylic acids reduce aluminum compound precipitation more effectively than other carboxylic acids. The hydroxy group of the hydroxy carboxylic acids provides additional coordination to aluminum and aluminum fluoride cations thereby maintaining the cations in solution and reducing precipitation.

EXAMPLE 3

Samples of a number of the titrated solutions formed in the tests of Example 2 were examined by $^{19}$F Nuclear Magnetic Resonance (NMR) spectroscopy to determine the extent of coordination to aluminum fluoride cation ($AlF^{2+}$) achieved by the various acids tested. That is, approximately 2 ml samples were removed by pipet and stored in glass vials at room temperature until their $^{19}$F NMR spectra could be obtained. The $^{19}$F spectras were obtained on a GE 400 MHz NMR spectrometer at room temperature using 10 mm glass tubes. The fluoride nuclei were observed at 376.5 MHz. Spectral Analysis (SPAN), a deconvolution tool, was employed to line fit the NMR peaks, thus providing accurate integration of the signals.

The results of the $^{19}$F NMR examinations showed that acetate coordinates to aluminum fluoride cation to a small extent while the hydroxy carboxylic acids of the present invention result in greatly enhanced coordination.

EXAMPLE 4

To determine the extent of precipitation of aluminum compounds, reactions of the hydrofluoric acid containing solutions identified in Tables III and IV were performed with kaolinite at room temperature and 200° F. The acid solution was added in an amount of 100 ml to 25 grams of kaolinite and samples were removed at various times and analyzed for Si and Al using an ALR 3410 Inductively Coupled Plasma Atomic Emission Spectrophotometer manufactured by Fisons Instruments at Dearborne, Michigan and by $^{19}$F NMR as previously described. The percent of fluoride species precipitated was determined by mass balance. The results are set forth in Tables III and IV.

TABLE III

ROOM TEMPERATURE TESTING

| Test No. | Acidic Fluid | Time, Hrs. | pH | % Fluoride Precipitate |
|---|---|---|---|---|
| 1. | 10% formic acid-1.5% HF (HF prepared with ammonium bifluoride) | 1 | — | 18 |
| | | 5 | — | 11 |
| | | 18 | — | 31 |

TABLE III-continued

ROOM TEMPERATURE TESTING

| Test No. | Acidic Fluid | Time, Hrs. | pH | % Fluoride Precipitate |
|---|---|---|---|---|
| 2. | 10% acetic acid - 1.5% HF (HF prepared with ammonium bifluoride) | 1 | — | 50 |
|  |  | 5 | — | 43 |
|  |  | 18 | — | 53 |
| 3. | 12% hydroxyacetic acid - 1.5% HF | 1 | 2.67 | 9 |
|  |  | 6 | 2.69 | 3 |
|  |  | 25 | 2.71 | 0 |
|  |  | 70 | 2.85 | 4 |
| 4. | 6% hydroxyacetic acid-6% acetic acid-1.5% HF (HF prepared with ammonium bifluoride) | 1 | 2.80 | 10 |
|  |  | 6 | 2.85 | 3 |
|  |  | 25 | 2.88 | 7 |
|  |  | 70 | 3.01 | 5 |
| 5. | 6% hydroxyacetic acid-6% acetic acid-1.5% HF (HF prepared with ammonium fluoride) | 1 | 3.68 | 25 |
|  |  | 6 | 3.72 | 6 |
|  |  | 25 | 3.75 | 0 |
|  |  | 70 | 3.85 | 1 |

TABLE IV

TESTING AT 200° F.

| Test No. | Acidic Fluid | Time, Hrs. | pH | % Fluoride Precipitate |
|---|---|---|---|---|
| 6. | 10% acetic - 1.5% HF[1] (HF prepared with ammonium bifluoride) | 0.75 | 2.29 | 13 |
|  |  | 1.50 | 2.70 | 19 |
|  |  | 3.00 | 2.74 | 23 |
|  |  | 70.00 | 2.69 | 87 |
| 7. | 10% acetic - 1.5% HF[2] (HF prepared with ammonium bifluoride) | 0.75 | 0.71 | 0 |
|  |  | 1.50 | 1.15 | 0 |
|  |  | 3.00 | 1.46 | 0 |
|  |  | 70.00 | 1.76 | 0 |
| 8. | 10% formic - 1.5% HF[1] (HF prepared with ammonium bifluoride) | 0.75 | 1.76 | 2 |
|  |  | 1.50 | 2.03 | 6 |
|  |  | 3.00 | 2.11 | 7 |
|  |  | 70.00 | 2.26 | 13 |
| 9. | 10% formic - 1.5% HF[2] (HF prepared with ammonium bifluoride) | 0.75 | 0.60 | 0 |
|  |  | 1.50 | 0.97 | 0 |
|  |  | 2.50 | 1.15 | 7 |
| 10. | 10% hydroxyacetic acid 1.5% HF (HF prepared with ammonium bifluoride) | 0.75 | 2.86 | 0 |
|  |  | 1.50 | 2.99 | 0 |
|  |  | 18.00 | 3.13 | 0 |
|  |  | 90.00 | 3.13 | 0 |
| 11. | 10% hydroxyacetic acid 1.5% HF[1] (HF prepared with ammonium bifluoride) | 0.75 | 1.85 | 0 |
|  |  | 1.50 | 2.11 | 0 |
|  |  | 18.00 | 2.38 | 0 |
|  |  | 90.00 | 2.41 | 0 |
| 12. | 6% hydroxyacetic acid-6% acetic acid-1.5% HF (HF prepared with ammonium bifluoride) | 0.75 | 2.98 | 11 |
|  |  | 1.50 | 3.11 | 8 |
|  |  | 18.00 | 3.30 | 0 |
|  |  | 70.00 | 3.39 | 0 |
| 13. | 6% hydroxyacetic acid-6% acetic acid-1.5% HF (HF prepared with ammonium fluoride) | 0.75 | 3.80 | 31 |
|  |  | 1.50 | 3.88 | 60 |
|  |  | 18.00 | 3.96 | 44 |

[1]1.5% HCl added to protonate ammonium bifluoride, no residual HCl after protonation
[2]4% HCl added to protonate ammonium bifluoride 2.5% residual HCl concentration after protonation Tests 1 and 2 illustrate formic-HF and acetic-HF blends. Tests 1 and 2 formed considerable quantities of precipitates. Test 3 in accordance with the present invention showed very little precipitate and that which formed appeared to redissolve and continue reacting. Tests 4 and 5 illustrate the inclusion of hydroxyacetic acid substantially reduces the quantity of precipitate formed in comparison to Test 2. The use of ammonium fluoride in Test 5 to generate the HF yielded a high solution pH than when ammonium bifluoride is used to generate the HF. Tests 6–9 demonstrate the effect of protonation of the fluoride salt so the organic acid is not spent on protonation to effect the HF formation. Test 6 demonstrates that precipitates form in acetic acid solutions when HCl is used to protonate the fluoride salt. A residual HCl content helps to control precipitate formation in Test 7. A residual HCl content helps to control precipitate formation in formic acid-HF solutions as indicated in Tests 8 and 9. No precipitates were found in Tests 10 and 11 utilizing the acidizing fluid of the present invention regardless of protonation source for the fluoride salt. Tests 12 and 13 indicate the hydroxyacetic acid help reduce precipitation. However, the acetic acid/hydroxyacetic acid mixtures are not as effective as the hydroxyacetic acid alone in preventing precipitation. Test 13 also illustrates the effect of the quantity of acid consumed to effect protonation upon the formation of precipitate.

Thus, the present invention is well adapted to attain the ends and advantages mentioned as well as those which are inherent therein. While numerous changes may be made by those skilled in the art, such changes are encompassed within the spirit of this invention as defined by the appended claims.

What is claimed is:

1. A method of reducing the precipitation of aluminum fluoride complexes following the acidizing of a sandstone formation with an acid solution containing hydrofluoric acid produced by protonation of a fluoride salt comprising the steps of:
    combining at least one hydroxy carboxylic acid selected from the group consisting of lactic acid and hydroxyacetic acid with said acid solution in an amount in the range of from about 5% to about 15% by weight of the resulting solution; and then contacting said sandstone formation with the resulting acid solution.

2. The method of claim 1 wherein said acid solution includes hydrochloric acid in an amount sufficient to protonate the source of said hydrofluoric acid.

3. A composition for acidizing an aluminum containing subterranean formation without substantial aluminum fluoride complexes precipitation comprising:
    a) water;
    b) hydrofluoric acid; and
    c) at least one hydroxy carboxylic acid selected from the group of lactic acid and hydroxyacetic acid present in an amount in the range of from about 5% to about 20% by weight of said composition.

4. The composition of claim 3 which further comprises hydrochloric acid.

5. The composition of claim 3 wherein said hydrofluoric acid is present in said composition in an amount in the range of from about 0.1% to about 6% by weight of said composition.

6. The composition of claim 3 which further comprises hydrochloric acid present in said composition in an amount in the range of from about 0.1% to about 6% by weight of said composition.

7. The composition of claim 3 wherein said hydroxy carboxylic acid is present in said composition in an amount in the range of from about 5% to about 15% by weight of said composition.

8. A method of acidizing an aluminum containing sandstone formation without substantial aluminum fluoride complexes precipitation comprising:
    contacting said formation with a preflush solution including: water; at least one compound selected from the group consisting of ammonium chloride and hydrochloric acid; and at least one hydroxy carboxylic acid present in said preflush solution in an amount in the range of from about 0.2% to about 20% by weight of said preflush solution; and after contacting said formation with said preflush solution, contacting said formation with an acidizing composition including: water; hydrofluoric acid; and at least one hydroxy carboxylic acid selected from the group of lactic acid and hydroxyacetic acid present in said acidizing composition in an amount in the range of from about 5% to about 20% by weight of said acidizing composition.

9. A method of acidizing an aluminum containing sandstone formation without substantial aluminum fluoride complexes precipitation comprising:

contacting said formation with an acidizing composition including: water; hydrofluoric acid; and at least one hydroxy carboxylic acid selected from the group of lactic acid and hydroxyacetic acid present in said acidizing composition in an amount in the range of from about 5% to about 20% by weight of said acidizing composition; and after contacting said formation with said acidizing composition, contacting said formation with an overflush solution including: water; at least one compound selected from the group consisting of ammonium chloride and hydrochloric acid; and at least one hydroxy carboxylic acid present in said overflush solution in an amount in the range of from about 0.2% to about 20% by weight of said overflush solution.

10. The method of claim 9 wherein said hydroxy carboxylic acid present in said overflush solution is selected from the group consisting of citric acid, tartaric acid, malic acid, lactic acid and hydroxyacetic acid.

* * * * *